United States Patent [19]
Thomas

[11] 3,866,476
[45] Feb. 18, 1975

[54] ANALYTICAL APPARATUS
[75] Inventor: Alan John Thomas, Richmond, England
[73] Assignee: The Rank Organisation Limited, London, England
[22] Filed: Aug. 9, 1973
[21] Appl. No.: 386,885

[30] Foreign Application Priority Data
Aug. 9, 1972 Great Britain.................... 37076/72

[52] U.S. Cl............................................. 73/423 A
[51] Int. Cl. ............................................. G01n 1/14
[58] Field of Search.......... 73/421 B, 423 A; 23/259

[56] References Cited
UNITED STATES PATENTS
3,192,968  7/1965  Baruch et al. ..................... 73/423 A
3,707,875  1/1973  Freeman............................ 73/423 A Primary Examiner—S. Clement Swisher
Attorney, Agent, or Firm—Brisebois & Kruger

[57] ABSTRACT

A mechanical sampling device for use in liquid analysis systems employs sequentially operated driving means to impart separate components of movement to a sample probe thereby transferring it between work stations. By employment of rotary solenoids as actuators, extreme accuracy of location especially for use in narrow vessels can be achieved in association with speed of operation and accuracy of dwell-time.

7 Claims, 4 Drawing Figures

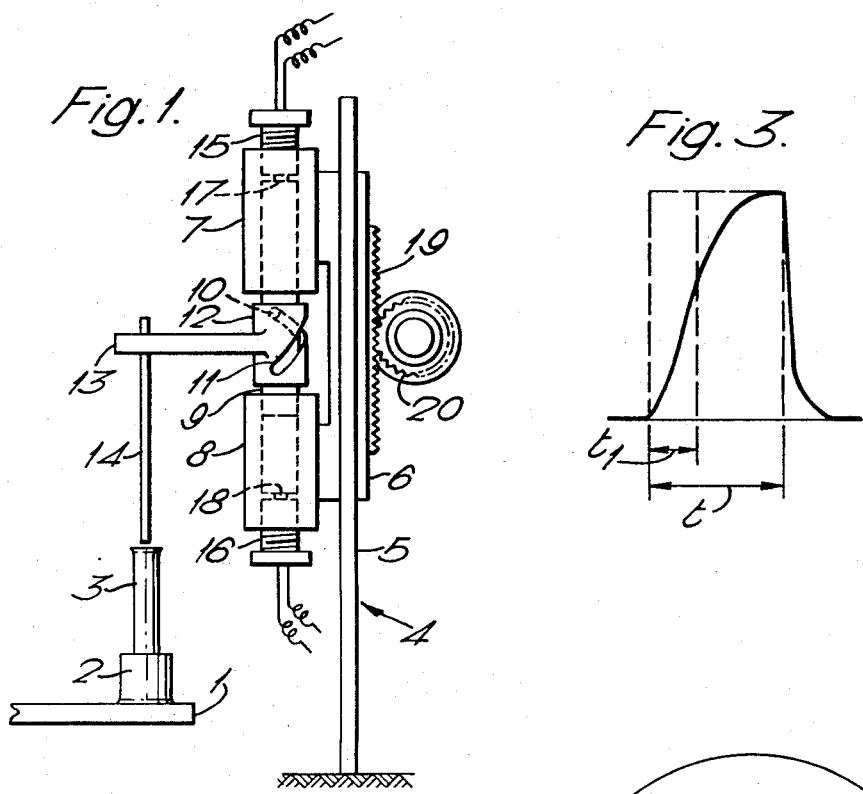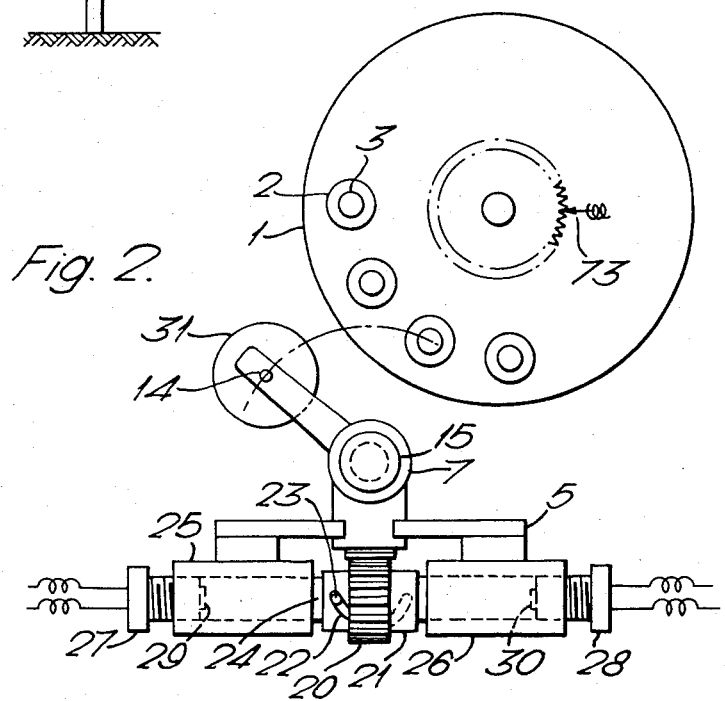

ANALYTICAL APPARATUS

The present invention relates to a device for automatically sampling liquids; and particularly to an improved device in which a plurality of samples of liquid can be operated on automatically and rapidly.

Devices for sampling liquids are already known. One such device incorporates a turntable which carries a series of vessels containing quantities of the chemicals to be sampled and a probe controlled to dip alternately into a sample vessel, into a reservoir of washing liquid and then into a subsequent sample vessel such that the probe is washed between consecutive sampling operations. In the known construction the probe is moved by a linkage providing a movement containing simultaneous components of horizontal and vertical motion required to transfer the probe from the sample vessels into the reservoir and back.

Known devices suffer from several drawbacks. The type of mechanism heretofore employed for moving the probes does not provide sufficient accuracy to permit the probe reliably to enter a small sampling vessel. For example, in the taking of chemical samples the sampling vessel may have a diameter in the region of 3 millimeters and sometimes even less than this. Any attempt to shorten the sampling times is made difficult by the action of the probe which is both slow and variable; this leads to inaccuracy and variation in the duration of the sampling action, especially where the depth of liquid being sampled varies from one vessel to another since differences in the levels of liquid in different vessels will mean that the probe is partially immersed for a different length of time in each vessel. The timing of the various operations in each sampling cycle is usually performed by cams which normally do not provide a high degree of accuracy, are difficult to set and have to be replaced from time to time because of wear.

A sampling device incorporating a probe which could be automatically, and extremely accurately, located for insertion into a narrow vessel, and which could be operated faster and with greater timing accuracy than the probes in known types of sampling device would have considerable economic and technical advantages over known such sampling devices.

According to the present invention a device for automatically sampling liquids, comprises means for conveying liquid to be sampled to a sampling position, means for supporting a sampling probe, and driving means for moving the probe between the sampling position where the probe is inserted into the liquid to be tested and a washing position where the probe is inserted into a washing liquid, the said driving means being operable to move the probe in successive steps of separate vertical and horizontal movement, each step of the movement being initiated by a sensor responsive to completion of the preceding step.

In one embodiment the probe support means include an upright rod with a transverse arm at the upper end thereof at the free end of which the probe is mounted. Preferably, in such an embodiment the driving means acts on the lower end of the rod to provide both the vertical and horizontal movements of the probe, the horizontal movements being effected by rotation of the rod through a given angle.

It is preferred that the driving means comprise at least one rotary solenoid for effecting each component of motion.

Rotary solenoids have different forms. A rotary solenoid of one type includes a solenoid providing linear motion and means incorporating a driving member, for example a ball or a pin working against an inclined plane to convert the linear motion to rotary motion. The inclined plane may be constituted by the sides of a helical slot in a cylindrical member rotatable about its axis but restrained against axial movement. A rotary solenoid of another type incorporates curved coils and curved plungers movable therein. The rotary solenoid for effecting horizontal movement may be directly coupled to the said rod to cause, when energised, pivotal movement about the axis thereof. Preferably at least one rotary solenoid includes or is provided with means for providing linear motion from rotary motion.

An electronic timing circuit may be provided to control a dwell period when the probe is at the lowermost part of its movement in the sampling position. The device may also control a dwell period when the probe is immersed in the washing position.

The means for feeding liquid to be sampled may be a turntable arranged to support sampling vessels, the turntable being associated with indexing means for rotating the turn-table through regular angles of arc and timing means determining the dwell period of the probe in the liquid being sampled and in the washing liquid. The indexing and the timing means preferably contain solid state circuits.

Alternatively, the means for feeding liquid to be sampled may be a conduit into which the probe dips at the sampling position. This construction makes it possible to take samples from flowing streams.

Two embodiments of the invention will now be more particularly described, by way of example, with reference to the accompanying drawings, in which:

FIG. 1 is a side view of a first embodiment of a sampling device;

FIG. 2 is a plan view of the device shown in FIG. 1;

FIG. 3 is a graph showing how the accurate timing provided by the device enables the sampling time to be shortened.

Figure 4:
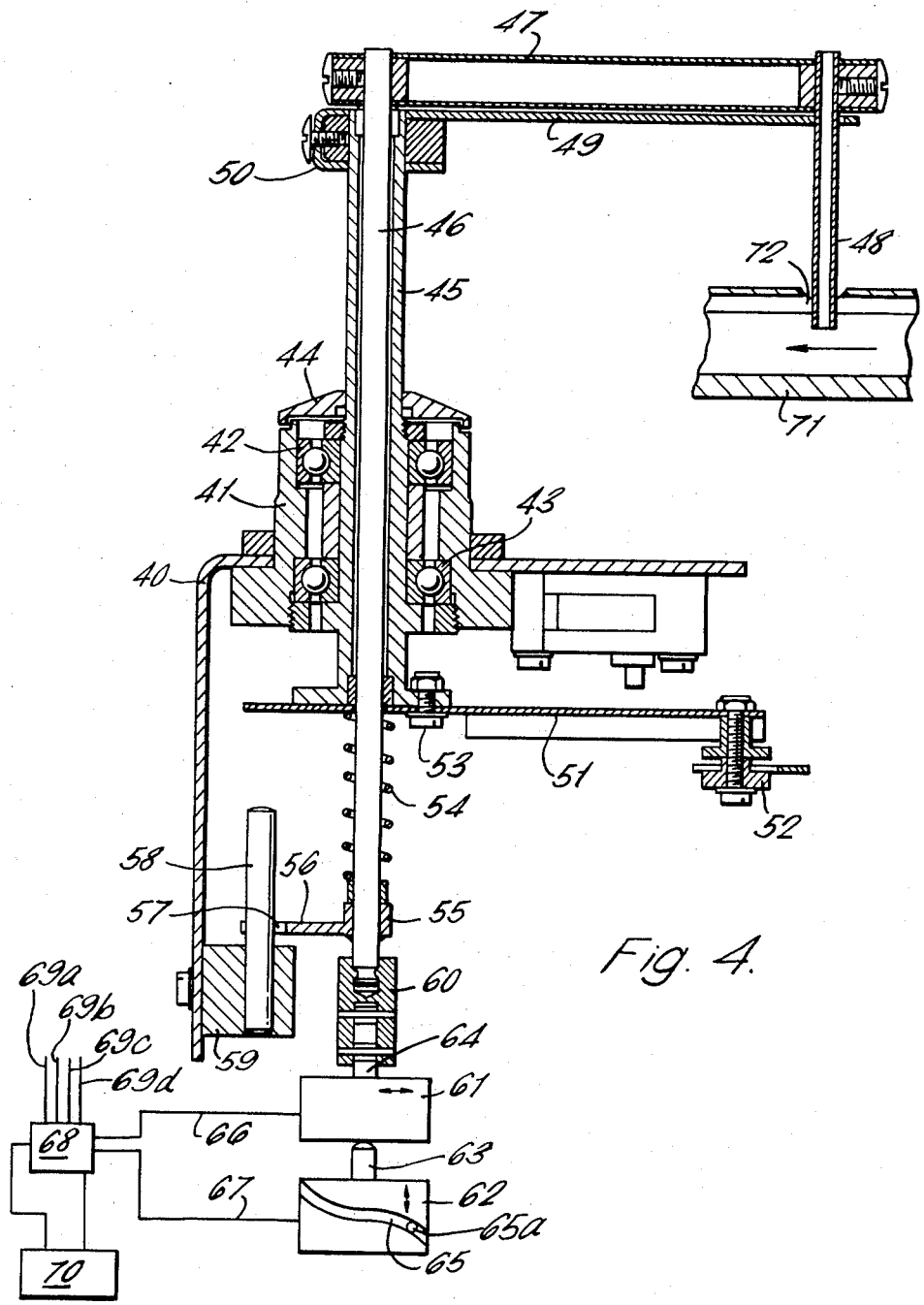
FIG. 4 is a sectional view of a second embodiment of the invention.

In the drawings 1 denotes a rotatable turntable fitted with sockets 2 for holding sample vessels such as test tubes 3, the turntable 1 being connected to mechanism 73 operable to index the turntable around in steps whereby to bring successively the sample vessels 3 to the sampling position and to hold them there while sampling is taking place. 4 denotes a structure presenting vertical guide bars 5 in which a sliding member 6 is vertically movable, the sliding member 6 supporting two solenoids 7 and 8 in which a common armature 9 is axially movable but is restrained against rotation. The armature 9 carries a member such as a ball or a pin 10 engaged in a helical slot 11 formed in a sleeve 12 carrying an arm 13 supporting a probe 14. The solenoids 7 and 8 carry adjustable abutments 15 and 16 respectively in the form of screwed plugs, said plugs being fitted with limit switches 17 and 18 connected to an electrical control circuit (not illustrated). The sliding member 6 is formed with a rack 19 engaged with a pinion 20 mounted co-axially on a sleeve 21 formed with a helical slot 22 engaged by a ball or a pin 22 presented by an armature 24 common to two solenoids 25 and 26 supported by the vertical guide bars 5. The solenoids 25 and 26 are also fitted with adjustable abutments 27 and 28 respectively carrying limit switches 29 and 30 respectively. 31 denotes a vessel for holding washing liquid. Electrical connections from the limit switches 29 and 30 are also made to the electrical control circuit which is also arranged to control the indexing of the turntable 1.

In practice, the electrical control circuit operates to index the turntable one position at a time to bring each sampling vessel 3 below a sampling position of the probe 14 and to hold it at this position for a given dwell period. When the sampling vessel 3 containing liquid to be sampled is in the sampling position the probe 14 is brought to the operative position in a manner to be described and is lowered into the sampling vessel 3 by energisation of the solenoid 26, causing the armature 24 to move into the solenoid. The member 23 thereupon, in moving along the helical slot 22, causes the sleeve 21 to rotate carrying with it the pinion 20 which by its engagement with the rack 19 causes the slide 6 to move downwardly along the guide bars 5 and dip the probe 14 into the liquid in the sampling vessel 3. The exact travel of the probe 14 downwardly is determined by the setting of the abutment 28 which stops the armature 24 at the position required to give the necessary downward movement of the probe 14, the limit switch 30 thereupon being operated to send a signal to the electrical control apparatus indicating that the sampling action is taking place. The electrical control apparatus after a predetermined dwell period sends a signal de-energising the solenoid 26 and energising the solenoid 25 thus moving the armature 24 in the opposite direction and causing the probe 14 to be raised out of the sampling vessel 3. When the armature 24 comes against the abutment 27 thereby stopping its further travel, the limit switch 29 sends a signal to the control apparatus and this apparatus then energises the solenoid 8 thus causing the armature 9 to move into the solenoid 8, the member 10 by its action in the helical slot 11 causing the sleeve 12 to swing the arm 13 and the probe 14 away from the sampling position and bring the probe above the washing vessel 31. When the armature 9 comes against the abutment 16 thus terminating the swing movement of the arm 13 the limit switch 17 sends a signal to the control apparatus and causes the solenoid 25 to be de-energised and the solenoid 26 to be energised thus moving the probe downwardly into the washing vessel where it is washed in the liquid contained therein. After a predetermined time in the washing liquid the control apparatus operates to de-energise the solenoid 26 and energise the solenoid 25 thus raising the probe 14 out of the washing vessel. When the limit switch 29 is operated showing that the probe has reached its uppermost limit a signal is sent energising the solenoid 7 thus causing the arm 13 and the probe 14 to be swung together to the sampling position. During the washing operation a signal is sent from the control apparatus to the indexing device causing the turntable 1 to move another step to bring the next sampling vessel into the sampling position so that the sampling operation can be repeated. Because of the fine adjustment possible of the positions of the abutments 15, 16, 27 and 28 exact positioning of the probe is possible so that the probe can be used with extremely small sampling vessels and the high speed action possible by the use of solenoids can be taken advantage of to provide short sampling times. Because of the accuracy of the time control provided by the control apparatus it is not necessary that the probe should be kept long enough in each liquid sample for steady state conditions to be reached as is necessary in previously known constructions. In such known constructions the time of sampling varies from one sampling operation to another so it is necessary to make sure that the probe remains in the liquid at least long enough so that the same conditions for sampling are reached every time. In the present construction partial stabilisation is quite effective provided the time the probe remains in the partially stabilised liquid is accurately controlled as the present device is capable of doing. This is illustrated in the graph of FIG. 3 in which $t$ is the time to reach steady state conditions and $t_1$ is the sampling time. If $t_1$ can be sufficiently accurately controlled $t_1$ can be considerably less than $t$ because the intercept of $t_1$ on the curve is always sufficiently close to the same sample point, but if $t_1$ cannot be accurately controlled it must be at least equal to $t$ to provide accurate results. A very great increase in the speed of sampling is thus possible by the device according to the invention and very small sampling vessels can be used because of the accuracy of control made possible by the rotary solenoid construction.

Alternative forms of rotary solenoid other than that illustrated in FIGS. 1 and 2 may be employed. For example, a substantially drum shaped type providing rotational movement of an axial actuator spindle may well be employed to provide the motive force for the movement of the probe arm. An embodiment in which this latter type of rotary solenoid is employed is shown in FIG. 4. In this embodiment the probe 48 is carried on a substantially horizontal arm 47 mounted at the upper end of a vertical rod 46 which is housed within a sleeve 45. The sleeve 45 is carried by bearings 42, 43 in a cylindrical housing 41 which is mounted on a chassis member 40 carried by a fixed part of the instrument. The cylindrical portion 41 is surmounted by a cap 44.

At the lower end of the rod 46 there is a coupling member 60 to which is coupled an axial actuator spindle 64 of a rotary solenoid 61 which is mounted by means (not shown) so as to be axially slidable with respect to the fixed frame part 40, but restrained against rotary movement such that any rotation of the spindle 64 with respect to the body of the solenoid 61 will be imparted to the rod 46. As mentioned above the solenoid 61 is of a type having curved coils and a correspondingly curved plunger.

Rigidly secured to the rod 46 adjacent the lower end thereof is a collar 55 having a transverse arm 56 through the free end of which is an opening 57 which is in the form of an arcuate slot. Extending through the slot 57 is a pin 58 parallel to the rod 46 and mounted in a block 59 carried by the frame part 40. The length of the arcuate slot 57 defines the range of available rotation for the rod 46 and acts as a limit stop to define the washing position and the sampling position of the probe 48.

The sleeve 45 within which the rod 46 is axially movable carries at its lower end an arm 51 secured to a flange on the sleeve 45 by means of a nut and bolt 53, and at the free end carries a tripping lever assembly which engages corresponding micro switches at each end position of the arcuate travel thereof. The micro switches are not shown, but are connected to input lines 69a and 69b of a control relay circuit 68 having two output lines 66 and 67, the output line 66 of which controls the energisation of the rotary solenoid 61.

Thus when the solenoid 61 is energised to move to the sampling position the micro switch associated with the line 69a will provide the control relay circuit 68 with a signal indicating the arrival of the probe at this position allowing the relay circuit 68 to de-energise the solenoid 61.

Between the lower face of the arm 51 which is secured to the bottom of the sleeve 45, and the upper face of the collar 55 which is rigidly secured to the shaft 46 there is a compression spring 54. Beneath the rotary solenoid 61 there is a further rotary solenoid 62 which is arranged to provide linear motion by means of an outer cylindrical drum having an helical groove 65 along which is constrained to move a peg 65a. The peg 65a is coupled to an armature which is caused to rotate in one direction or another upon energisation or de-energisation of the solenoid 62, and the armature is connected to an axial spindle 63 which is thus urged to move axially out from or retracted axially into the drum like body of the rotary solenoid 62 upon energisation or de-energisation of the solenoid 62 respectively. Extension of the spindle 63 causes the solenoid 61 and the rod 46 to be raised vertically, and de-energisation of the solenoid 62 allows the rod 46 to fall, urged in this respect by the spring 54. Two further micro switches (not shown) are positioned to detect respective ends of the vertical movement of the rod 46 and to provide electrical signals to the inputs 69c and 69d of the control relay circuit 68. Each time the micro switch which detects the arrival of the rod 46 at its lower most position provides a signal to the control relay circuit 68 on the line 69d a timer circuit 70 is energised to provide alternately a first and second timing interval which maintains the system in that position for a given dwell period.

The apparatus of FIG. 4 is associated with a conduit 71 which carries the fluid to be sampled. The conduit has an opening 72 into which the probe 48 dips when in the lowered position shown in FIG. 4. There is also provided a washing vessel (not shown in FIG. 4) at a position spaced along an arc centered on the shaft 46 and carried by a fixed part of the frame 40.

The embodiment described above operates as follows. The rest position of the apparatus is with the probe 48 in the lowered position in the washing vessel; upon commencement of an operating cycle the control relay circuit 68 energises the solenoid 62 via the output line 67 to cause the shaft 46 to be raised vertically such that the lowermost end of the probe 48 is above the rim of the washing vessel. The sleeve 45 remains in the axial position shown in FIG. 4 and the arm 49 is thus in engagement with the lower end of the probe 48. When the rod 46 reaches its upper position the micro switch associated with the line 69c is tripped and a signal is passed on the line 69c to the control circuit 68 which thus operates to de-energise the solenoid 62 and to energise the solenoid 61 thereby causing the shaft 46 and sleeve 45 to rotate together to the sampling position which is determined by abutment of the pin 58 against the end of the slot 57 in the arm 56. At this position the micro switch associated with the line 69a is tripped and provides a signal along this line to the control relay circuit 68 which then de-energises the solenoid 61 and energises the solenoid 62 in the reverse direction thereby causing the probe to be rapidly lowered into the sampling vessel 3.

At the bottom of this vertical movement the micro switch associated with the line 69d is tripped and the signal along this line to the control relay circuit 68 causes energisation of the timing circuit 70 to maintain the apparatus in this position for a predetermined dwell period which may be any selected sampling time in accordance with the sampling operation which is to be undertaken. At the expiry of the predetermined dwell period the timer 70 produces a control signal to the control relay circuits 68 which then energises the rotary solenoid 62 to raise the rod 46 and the probe 48 from the sampling vessel. At the end of this upward vertical movement the micro switch associated with the line 69c and that associated with the line 69a are both in the tripped position. Simultaneously the relay 61 is energised to return the shaft 46 through the predetermined angle back to the washing position, following which the solenoid 62 is energised to lower the probe into the washing vessel. The cycle of operation then automatically recommences. The time period which elapses under the control of the timer 70 while the probe is in the washing position may be the same as or different from the time period during which the probe is held in the sampling position in dependence on the individual requirements and the timer 70 is preferably adjustable such that both timing periods which occur alternately can be controlled to suit the series of sampling operations being performed at any one time.

The rotary solenoids permit very rapid action and the separation of the movement into successive vertical and horizontal steps makes it possible to ensure that the probe is accurately aligned in a predetermined position before being lowered such that the lowering step can be performed at high speed without undue risk of misalignment of the probe causing damage to the sampling vessel or conduit or otherwise deleteriously effecting the operation of the sampling system.

It will be appreciated that a sampling mechanism in accordance with this invention may be used with sample presentation systems having a linear movement rather than a rotary turn-table as described in the specific embodiment.

I claim:

1. Apparatus for automatically sampling liquids, comprising:

conveying means for conveying liquid to be sampled to a sampling station, a sampling probe, movable support means for said sampling probe, said support means being movable to transfer said probe between said sampling station and a washing station, washing means at said washing station, driving means driving said movable support means to transfer said probe from said washing station to said sampling station and back to said washing station, said driving means operating to cause said probe to move in separate consecutive steps of alternate vertical and horizontal movement and including at least one rotary solenoid for effecting each step of said motion, and a plurality of sensor means disposed in positions to detect when each said vertical or horizontal step of said movement of said probe is completed, said sensor means operating to energise said drive means to intitiate a subsequent step of said movement upon detection of completion of a preceding step thereof.

2. The apparatus of claim 1 wherein at least one said rotary solenoid includes means for providing linear motion from the rotary motion of said solenoid.

3. The apparatus of claim 1 wherein said probe support means include:
an upright rod,
a transverse arm mounted at the upper end of said upright rod, and
mounting means at the free end of said transverse arm on which said probe is carried, and
said rotary solenoid for effecting horizontal movement is directly coupled to said rod whereby to cause, when energised, pivotal movement about said longitudinal axis of said rod.

4. The apparatus of claim 3 wherein there is further provided coupling means between said rotary solenoid for effecting vertical movement and said rod, said coupling means providing linear movement from the rotary movement of said solenoid.

5. The apparatus of claim 4 wherein said coupling means includes a driving member co-operating with an inclined cam face.

6. The apparatus of claim 5, wherein said inclined cam face is formed as a substantially helical face on an element which is movable axially of the solenoid but is restrained against rotation about said axis thereof.

7. The apparatus of claim 6, wherein said axially movable element is a cylindrical sleeve with a helical groove therein, said driving member comprising a radial peg on a part of said solenoid which turns about said axis thereof when said solenoid is energised.

* * * * *